June 8, 1937. H. RIESTER 2,083,473
SCREW THREAD CUTTER ATTACHMENT
Filed July 13, 1936 2 Sheets-Sheet 1

Hubert Riester
INVENTOR
BY Victor J. Evans & Co.
ATTORNEYS

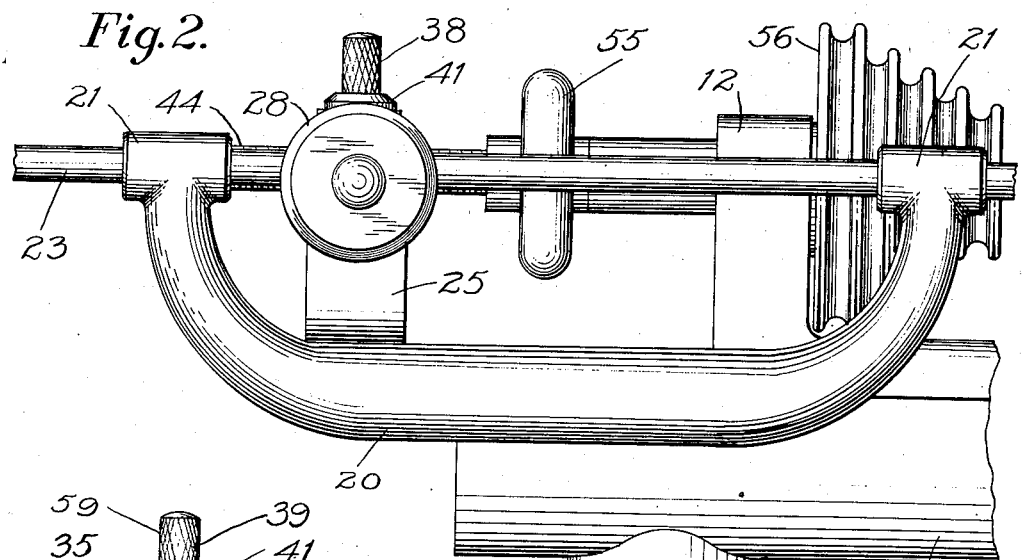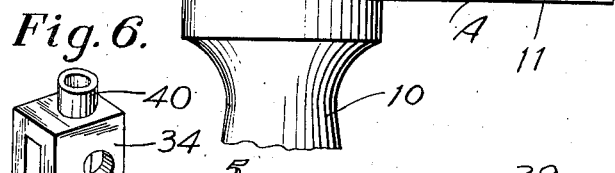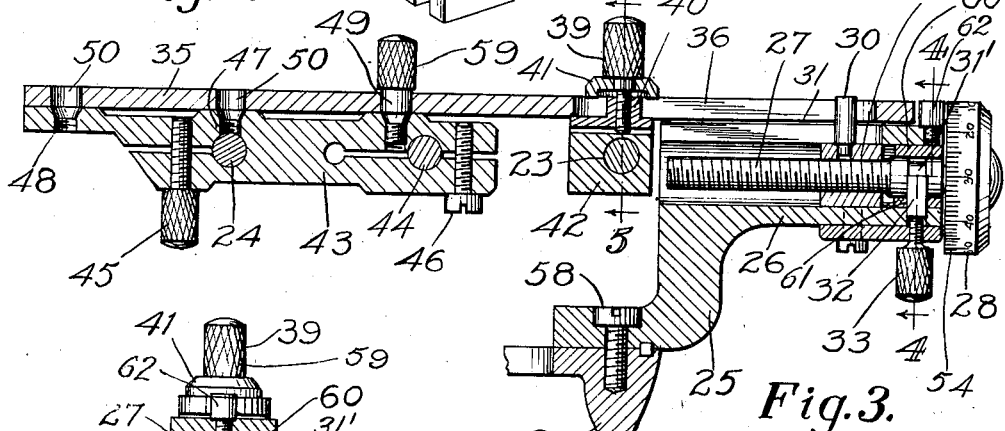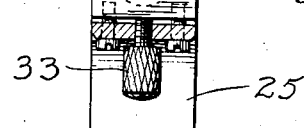

Patented June 8, 1937

2,083,473

UNITED STATES PATENT OFFICE 2,083,473

SCREW THREAD CUTTER ATTACHMENT

Hubert Riester, Collingswood, N. J.

Application July 13, 1936, Serial No. 90,436

4 Claims. (Cl. 82—5)

The invention relates to a screw cutting attachment and more especially to screw thread attachments for bench lathes.

The primary object of the invention is the provision of an attachment of this character, wherein the thread cutting tool and the work can be adjusted so as to regulate the size of threads to be cut through the use of but one master screw, there being an indicator which will identify the character of thread cut in the work and such indicator is readily and easily set in conformity with the requirement of thread to be cut.

Another object of the invention is the provision of an attachment of this character, wherein the same is applicable to a bench lathe so that screw threads of different sizes can be cut in the work and accuracy had in the cutting of such threads in conformity with the size required, the attachment being novel in its entirety and is susceptible of a wide range of adjustment.

A further object of the invention is the provision of an attachment of this character, which is simple in its construction, readily and easily applied to a bench lathe for the service thereof in cutting threads of different sizes, easy of adjustment, thoroughly reliable and efficient in its operation, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a fragmentary side elevation thereof.

Figure 3 is a vertical transverse sectional view through the attachment.

Figure 4 is a sectional view on the line 4—4 of Figure 3.

Figure 5 is a sectional view on the line 5—5 of Figure 3.

Figure 6 is a perspective view of an adjunct of Figure 5.

Similar reference characters indicate corresponding parts throughout the several views in the drawings.

Figure 1:
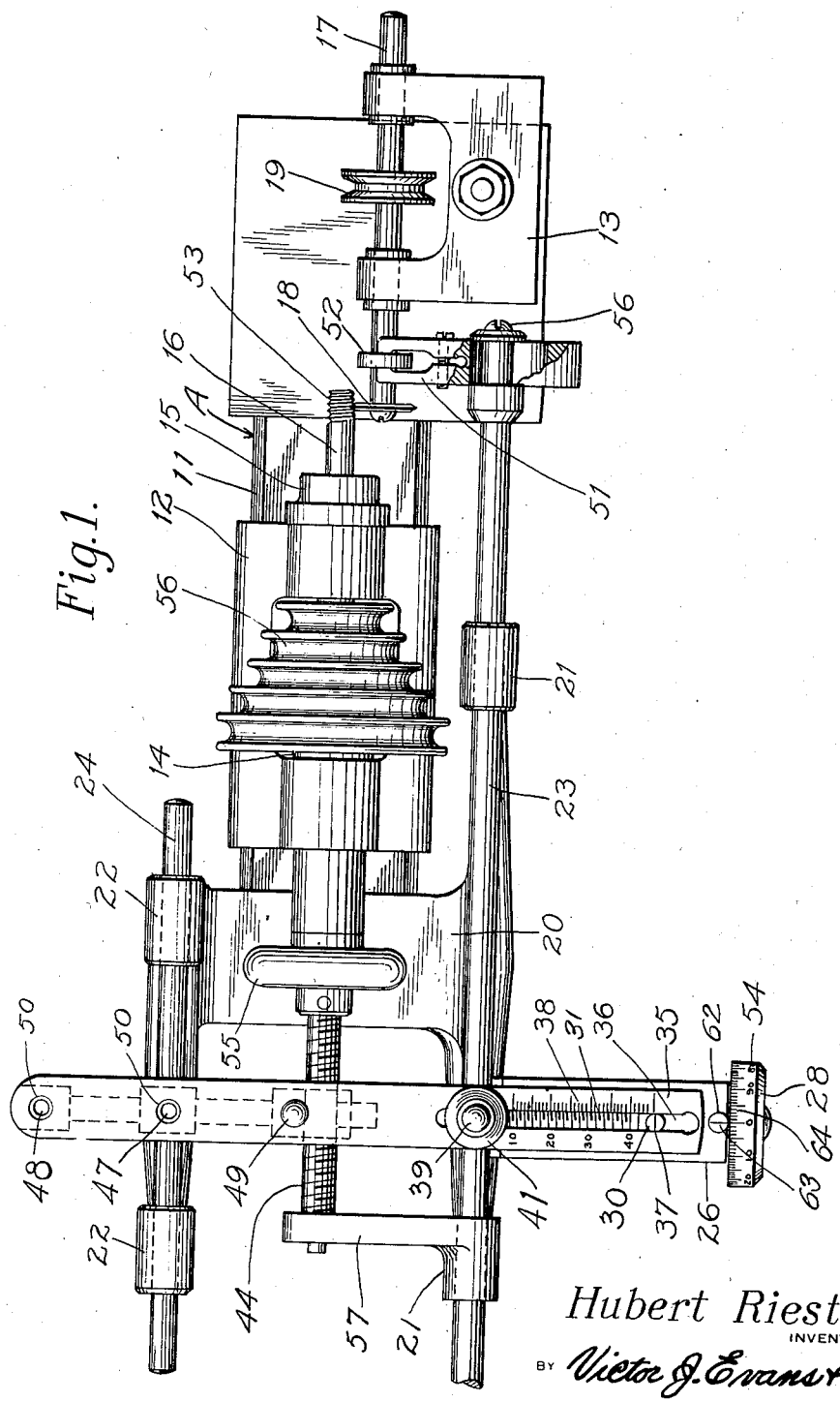
Figure 1 is a top plan view of a bench lathe showing the attachment constructed in accordance with the invention applied.

Referring to the drawings in detail, A designates generally a bench lathe having a pedestal 10 carrying a bed 11 on which is adjustably fitted a head stock 12 and a slide rest 13, respectively, the said slide rest being adapted for cross adjustment as well as longitudinal adjustment on the bed while the head stock 12 is susceptible of longitudinal adjustment upon said bed.

The head stock 12 has journaled therein a chuck spindle 14 fitted with a suitable chuck 15 for work, an example of the latter being a bolt as indicated at 16. The slide rest 13 has therein a tool spindle 17 operating a thread cutting cutter 18, the spindle 17 being also fitted with a pulley 19 for a drive belt (not shown).

Upon the bed 11 is fixed rearwardly of the head stock 12 a guide saddle 20 formed with the upwardly directed pairs of guide eyes 21 and 22, respectively, which are arranged spaced apart at opposite sides of the lathe bed 11 and in which are fitted slide rods 23 and 24, respectively.

Fixed to the saddle 20 is a bracket 25 formed with a horizontally disposed guide barrel 26 in which is rotatably fitted the threaded stem 27 of an adjusting knob 28, the stem 27 being threaded in a follower 29 slidably fitting the barrel 26. The follower 29 carries a combined indicator and fulcrum pin 30 projected upwardly through an elongated slot 31 provided in the top of the said barrel 26. This barrel 26 extends laterally of the lathe A from one side thereof, that is, outwardly from the front side of the lathe.

The stem 27 has formed therein next to the knob 28 an annular channel or groove 31' in which fits a key 32 acted upon by a setting screw 33 so that the said stem 27 can be rotatably latched within the barrel 26 and also can be frictionally bound when the knob 28 is set at a determined adjustment of such stem in locating the pin 30 in the slot 31 in said barrel for altering the fulcrum position of such pin.

Fitted on the slide rod 23 is an adjustable clamp 34 for the mounting of a gage bar 35 which extends over the barrel 26 and is formed with a slot 36 for accommodating the pin 30, it having an indicator mark 37 in its top for coaction with a scale 38 provided on the upper side of the bar 35. The bar 35 is swingingly fixed to the clamp 34 by a holding screw 39 threaded in a boss 40 formed on said clamp and working against a crowning washer 41 above said bar 35. This screw 39 coacts with a clamping key 42 for the locking of the clamp 34 upon the rod 23.

Clamped upon the rod 24 is a cross head 43 while fixed to the chuck spindle 14 in the head stock 12 is a master screw 44, the said cross head 43 being in threaded engagement with the master screw and such cross head is adjustably secured to the rod 24 by the screw 45 while the threaded engagement of the said cross head with the master screw 44 is had by the screw 46.

The cross head 43 has provided in its upper side intermediate and outer threaded sockets 47 and 48, respectively, which are spaced from each other and selectively engageable therewith is a pivot screw 49 selectively insertable in holes 50 provided in the bar 35 and companions to the sockets 47 and 48 so that by altering the pivot screw 49 in the said bar 35 and cross head 43 the throw of the rod 23 will be changed.

The rod 23 has fitted thereto a laterally adjustable fork 51 engageable with an annular shoulder 52 formed on the arbor for the thread cutter 18 and thus when the rod 23 is shifted the cutter 18 is correspondingly moved therewith and in this manner the threads 53 cut in the work 16, said cutter being regulated in conformity with the setting of the pin 37 with respect to the scale 38 upon the bar 35, the knob 28 being peripherally marked with a setting scale 54 having a calibration consistent with the scale 38 and in this manner the attachment can be set and will indicate a change in the number of threads to be cut per inch on the work 16, the threads being indicated at 53 on this piece of work.

The use of the single master screw 44 in the attachment enables one to obtain from thirty-six threads per inch to one hundred and fifty threads thereof, the master screw being equipped with the eighteen threads per inch and by substituting a thirty-two thread per inch master screw the range of threads per inch on the work will be from one hundred and fifty to three hundred threads per inch as cut by the adjustment of the bar 35 upon the cross head 43 and the changing of the pin 37 through manipulation of the knob 28.

The master screw 44 has fixed thereto a hand turning wheel 55, the chuck spindle 14 being fitted as usual with a stepped grooved speed belt pulley 56 for a drive belt (not shown).

The fork 51 is susceptible of adjustment on the rod 23 and also slide rest 13 is adjustable in conformity with the size of the work for thread cutting thereof.

The bar 35 constitutes a throw lever for the rod 23 and the throw of the lever under the setting thereof varies the position of the thread cutter 18 in conformity with the sizes of thread cutting of such work as may be required. The master screw 44 is the feeder for the throw of the bar or lever 35, the extent of throw of the latter being regulated by the positioning of the pivot pin 49 selectively in the sockets 47 and 48 and holes 50, respectively.

The fork 51 is held fast in its adjustment on the rod 23 by a binding screw 56.

The master screw 44 at its outer end is journaled in a hanger 57 formed with one of the eyes 21 of the saddle 20, the bracket 25 being secured in place by a fastener 58. The screws 33, 38 and 49 are preferably provided with knurled heads 59 to permit easy adjustment thereof.

The stem 27 of the knob 28 is fitted in a bushing 60 confined within the barrel 26 and having a clearance 61 for the key 32, the pin 30 being the fulcrum for the bar or lever 35. This pin 30, as before stated, is shiftable to change the fulcrum point of the bar or lever 35 according to the size of the thread to be cut in the work. At the uppermost side of the barrel 26 next to the knob 28 is a pin 62, it having an indicator mark 63 for coaction with a scale 64 provided peripherally on the knob 28 so that action may be had in the setting of the fulcrum pin 30 when turning the said knob 28 by hand.

What is claimed is:

1. In a lathe, a slide rest, a head stock, a rotary spindle in the head stock and having a chuck, a stationary saddle rearwardly of the stock, slide rods in said saddle on opposite sides of the spindle, a cross head fitted to one rod, a master screw connected with said spindle and threaded in the cross head, a throw arm selectively pivoted to the cross head, means swingingly connecting the throw arm to the other rod, a changeable fulcrum for the throw arm and fitted with the saddle, a cutter carried by the slide rest, a connection between the cutter and the said other rod for regulating the cutting action of said cutter on work held with the chuck, and means for changing the fulcrum.

2. In a lathe, a slide rest, a head stock, a rotary spindle in the head stock and having a chuck, a stationary saddle rearwardly of the stock, slide rods in said saddle on opposite sides of the spindle, a cross head fitted to one rod, a master screw connected with said spindle and threaded in the cross head, a throw arm selectively pivoted to the cross head, means swingingly connecting the throw arm to the other rod, a changeable fulcrum for the throw arm and fitted with the saddle, a cutter carried by the slide rest, a connection between the cutter and the said other rod for regulating the cutting action of said cutter on work held with the chuck, means for changing the fulcrum, and a hand wheel fixed to said spindle.

3. In a lathe, a slide rest, a head stock, a rotary spindle in the head stock and having a chuck, a stationary saddle rearwardly of the stock, slide rods in said saddle on opposite sides of the spindle, a cross head fitted to one rod, a master screw connected with said spindle and threaded in the cross head, a throw arm selectively pivoted to the cross head, means swingingly connecting the throw arm to the other rod, a changeable fulcrum for the throw arm and fitted with the saddle, a cutter carried by the slide rest, a connection between the cutter and the said other rod for regulating the cutting action of said cutter on work held with the chuck, means for changing the fulcrum, a hand wheel fixed to said spindle, a scale on said arm, and an indicator on the fulcrum for cooperation with the scale.

4. In a lathe, a slide rest, a head stock, a rotary spindle in the head stock and having a chuck, a stationary saddle rearwardly of the stock, slide rods in said saddle on opposite sides of the spindle, a cross head fitted to one rod, a master screw connected with said spindle and threaded in the cross head, a throw arm selectively pivoted to the cross head, means swingingly connecting the throw arm to the other rod, a changeable fulcrum for the throw arm and fitted with the saddle, a cutter carried by the slide rest, a connection between the cutter and the said other rod for regulating the cutting action of said cutter on work held with the chuck, means for changing the fulcrum, a hand wheel fixed to said spindle, a scale on said arm, an indicator on the fulcrum for cooperation with the scale, and a setting dial included with the means for changing the fulcrum.

HUBERT RIESTER.